April 6, 1926.

I. E. BOEKENOOGEN ET AL 1,579,504

TOWING DEVICE

Filed Jan. 14, 1925

Inventors:
I. E. Boekenoogen.
E. R. Ames.
By Whiteley and Ruckman
Attorneys.

Patented Apr. 6, 1926.

1,579,504

UNITED STATES PATENT OFFICE.

ISAAC E. BOEKENOOGEN AND EARL R. AMES, OF AITKIN, MINNESOTA.

TOWING DEVICE.

Application filed January 14, 1925. Serial No. 2,295.

*To all whom it may concern:*

Be it known that we, ISAAC E. BOEKENOOGEN and EARL R. AMES, citizens of the United States, residing at Aitkin, in the county of Aitkin and State of Minnesota, have invented certain new and useful Improvements in Towing Devices, of which the following is a specification.

Our invention relates to devices for use in towing motor vehicles. It will be understood by those engaged in rescuing broken-down motor vehicles, that when the front end of the vehicle is broken down, this end is jacked up and the vehicle is towed front end forward with no difficulty, since the rear wheels follow along without sidewise turning or wobbling movement. But when the rear end of a motor vehicle is broken down, this end is jacked up and the vehicle is towed rear end forward. On account of the manner in which the front wheels are mounted for steering purposes, they are free to wobble or swing from side to side with disastrous results unless such movement is restrained. It is not always convenient to have a driver in the car which is being towed in this manner nor is it an easy matter for the driver, even if present, to control the towed car since he is facing backwardly. An object therefore of our invention is to provide a device which will prevent the backwardly disposed front wheels from swinging movement on the axle when the motor vehicle is being towed rear end forward. We accomplish this object by providing a device having a member adapted to fit upon and be firmly clamped to the front axle and another member adapted to fit upon and be firmly clamped to the steering knuckle arm tie rod, these two members being connected together so that when the device is in use, relative sidewise movement of the two members is prevented, thereby causing the wheels to follow straight ahead in the direction in which the motor vehicle is being towed. Another object is to provide a device of this character which is adjustably constructed in such manner that it may be used on various makes of motor vehicles.

The full objects and advantages of our invention will appear in connection with the detailed description thereof and the novel features embodied in our inventive idea will be particularly pointed out in the claims.

Figure 1:
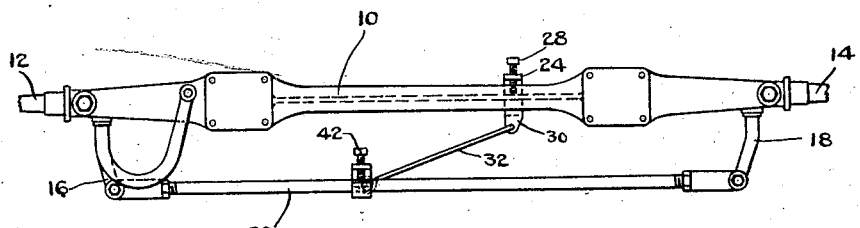
Figure 2:
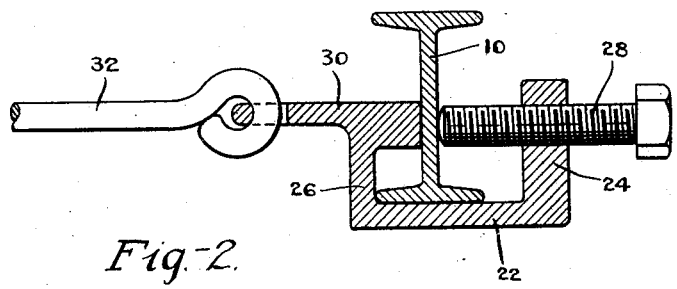
Figure 3:
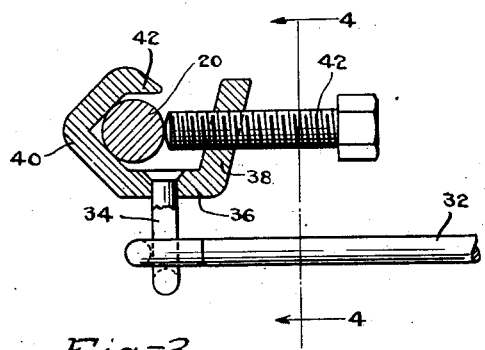
Figure 4:
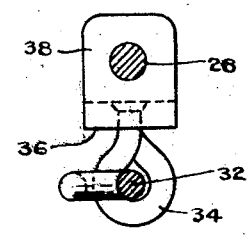

In the accompanying drawings which illustrate a practical embodiment of our invention, Fig. 1 is a plan view showing the front axle and a portion of the steering mechanism of a motor vehicle with our device secured thereto. Fig. 2 is a sectional view of one end of the device secured to the front axle. Fig. 3 is a sectional view of the other end of the device secured to the steering knuckle arm tie rod. Fig. 4 is a view in section on the line 4—4 of Fig. 3.

Referring to the drawings, a front axle 10 is shown provided with the customary swinging spindles 12 and 14 for receiving the front wheels, these spindles having secured thereto steering knuckle arms 16 and 18 connected by the tie rod 20. Referring now to our device, one end thereof consists of a member having a base 22 from the ends of which flanges 24 and 26 extend upwardly. The flange 24 is provided with a screw threaded hole adapted to receive the threads of a bolt 28. The flange 26 at its upper end is provided with a horizontal flange 30 which extends away from the two opposite sides thereof. This flange 30 is in alignment with the bolt 28 and the inner end of this flange is adapted to engage the side of the front axle 10 which is opposite the side thereof engaged by the bolt 28. A rod 32 is pivotally attached to the outer end of the flange 30 and this rod at its other end is pivotally attached to an eye 34 which extends downwardly from the base 36 of another member of the device. Flanges 38 and 40 extend in a generally upward direction from the ends of the base 36. Flange 38 is preferably outwardly inclined for a purpose which will presently appear and this flange is provided with a screw threaded hole to receive the threads of a bolt 42. The flange 40 is in general V-shaped with its lower portion inclined away from the base 36 and its upper portion is inclined toward the flange 38 and provided at its upper extremity with a short portion 42 substantially parallel with the base 36. The apex of the V-shaped flange is disposed opposite the inner end of the bolt 42.

The operation and advantages of our invention will now be obvious. When the bolt 28 is partly unscrewed, the member by which it is carried may be readily slipped upon the front axle as will be understood from Fig. 2. Upon screwing down the bolt 28, the said member will be firmly clamped in place on the front axle 10 which is shown in the form of an I-beam. It will be obvious, however, that this member, on account of the manner in which it is constructed, may be conveniently clamped upon axles having other shapes. When the bolt 42 is partly unscrewed, the member by which it is carried may be readily slipped upon the tie rod 20. It is obvious from Fig. 3 that the outward inclination of the flange 38 permits this. Upon screwing down the bolt 42, the said member will be firmly clamped in place on the tie rod. This result is accomplished when the tie rod is round on account of its engagement in the V-shaped flange 40. If the tie rod is square the portion 42 and the base 36 engage opposite sides of the square rod so that firm clamping engagement is effected. Since the rod 32 is pivotally attached to the two end members of the device and since the bolts 28 and 42 may be unscrewed to any desired extent, the device may be easily and quickly attached and detached for use with various makes of cars, regardless of the size and shape of the front axle and tie rod and the distance between them.

We claim—

1. A device for use in towing motor vehicles comprising an end member consisting of a base, a flange extending up from one end of said base, a bolt threaded through said flange, a second flange extending up from the other end of said base and a horizontal flange extending from the top of said second flange in alinement with said bolt whereby said member is adapted to fit upon and be clamped to the front axle, a rod pivotally attached at one end to said member, a second end member consisting of a base to which the other end of said rod is pivotally attached, a flange extending up from one end of said base, a bolt threaded through said flange and a second flange extending up from the other end of said base, said second flange being V-shaped whereby said second member is adapted to fit upon and be clamped to the steering knuckle arm tie rod.

2. A device for use in towing motor vehicles comprising an end member consisting of a base, a flange extending up from one end of said base, a bolt threaded through said flange, a second flange extending up from the other end of said base and a horizontal flange extending from the top of said second flange in alignment with said bolt whereby said member is adapted to fit upon and be clamped to the front axle, a rod pivotally attached at one end to said horizontal flange, a second end member consisting of a base, an eye carried by said base, to which the other end of said rod is pivotally attached, a flange extending up from one end of said base, a bolt threaded through said flange and a second flange extending up from the other end of said base, said second flange being V-shaped and having a short portion extending inwardly from its top in substantially parallel relation to said base whereby said second member is adapted to fit upon and be clamped to the steering knuckle arm tie rod.

In testimony whereof we hereunto affix our signatures.

ISAAC E. BOEKENOOGEN.
EARL R. AMES.